United States Patent
Ding et al.

(10) Patent No.: US 9,394,198 B2
(45) Date of Patent: Jul. 19, 2016

(54) SIMPLIFIED PROTECTION LAYER FOR ABRASION RESISTANT GLASS COATINGS AND METHODS FOR FORMING THE SAME

(71) Applicant: Intermolecular, Inc., San Jose, CA (US)

(72) Inventors: Guowen Ding, San Jose, CA (US); Minh Huu Le, San Jose, CA (US)

(73) Assignee: Intermolecular, Inc., San Jose, CA (US)

( * ) Notice: Subject to any disclaimer, the term of this patent is extended or adjusted under 35 U.S.C. 154(b) by 89 days.

(21) Appl. No.: 14/097,463

(22) Filed: Dec. 5, 2013

(65) Prior Publication Data
US 2015/0158762 A1   Jun. 11, 2015

(51) Int. Cl.
C03C 17/34 (2006.01)
B05D 7/00 (2006.01)

(52) U.S. Cl.
CPC ......... C03C 17/3435 (2013.01); C03C 17/3411 (2013.01); C03C 17/3441 (2013.01); *B05D 7/56* (2013.01); *B05D 7/58* (2013.01); *C03C 2217/78* (2013.01); *C03C 2218/328* (2013.01); *Y10T 428/30* (2015.01)

(58) Field of Classification Search
None
See application file for complete search history.

(56) References Cited

U.S. PATENT DOCUMENTS

| | | | | |
|---|---|---|---|---|
| 5,135,808 | A * | 8/1992 | Kimock | B32B 17/06 428/336 |
| 5,635,245 | A * | 6/1997 | Kimock | B32B 17/06 427/106 |
| 7,052,585 | B2 | 5/2006 | Veerasamy et al. | |
| RE40,531 | E * | 10/2008 | Graff | B32B 27/00 426/126 |
| 8,293,344 | B2 | 10/2012 | Lemmer | |
| 2012/0015195 | A1* | 1/2012 | Wang | C03C 15/00 428/426 |

OTHER PUBLICATIONS

V.S. Veerasamy et al.; Diamondlike Amorphous Carbon Coatings for Large Areas of Glass; Jan. 1, 2003; Elsevier; Unknown, Thin Solid Films 442 (2003) 1-10.

* cited by examiner

*Primary Examiner* — Michael P Rodriguez (57) ABSTRACT

Embodiments provided herein describe abrasion resistant glass coatings and methods for forming abrasion resistant glass coatings. A glass body is provided. An abrasion resistant layer is formed above the glass body. The abrasion resistant layer includes an amorphous carbon. A pull-up layer is formed above the abrasion resistant layer. A protective layer is formed above the pull-up layer. The protective layer may include a titanium-based nitride. The pull-up lay may include tungsten oxide, zirconium oxide, manganese oxide, molybdenum oxide, titanium oxide, or a combination thereof.

15 Claims, 11 Drawing Sheets

SIMPLIFIED PROTECTION LAYER FOR ABRASION RESISTANT GLASS COATINGS AND METHODS FOR FORMING THE SAME

The present invention relates to abrasion resistant glass coatings. More particularly, this invention relates to abrasion resistant glass coatings with a simplified protection layer and methods for forming such coatings.

BACKGROUND OF THE INVENTION

Abrasion resistant coatings are used on glass in various types of products, such as windows (e.g., on buildings and vehicles), bottles, containers, lenses, photovoltaic devices, and screens for flat-panel displays, touch panels, and climate control systems.

Conventional abrasion resistant glass coatings include an abrasion resistant layer (e.g., an amorphous carbon, such as diamond-like carbon) and several other layers, such as an oxide layer and a nitride layer, formed above the above the abrasion resistant layer. The nitride layer typically provides environmental and chemical durability, and the oxide layer is used as a "pull-up" layer, which can be easily dissolved after tempering, to allow easy removal of the nitride (i.e., the final product may only include the glass and the abrasion resistant layer).

In order to protect the oxide and nitride layers during handling, an additional "top protection film" (TPF), often made of a plastic or polymer, is applied above the nitride layer. The TPF is typically removed before tempering. After tempering, the nitride layer, and the oxide layer are removed (e.g., perhaps using solvents).

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which.

DETAILED DESCRIPTION

A detailed description of one or more embodiments is provided below along with accompanying figures. The detailed description is provided in connection with such embodiments, but is not limited to any particular example. The scope is limited only by the claims, and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

Embodiments described herein provide a simplified method for protecting abrasion resistant glass coatings, such as during handling and/or before the tempering process. In some embodiments, new materials are used for the protective layer and/or the pull-up layer which may eliminate the need for the use of a "top protection film" (TPF) (e.g., a plastic or polymer), such as during handling, transportation, and/or tempering.

In some embodiments, protective layer includes a titanium-based nitride, such as titanium nitride, titanium-aluminum nitride, titanium-silicon-zirconium nitride, titanium-carbon nitride, titanium-boron nitride, titanium-molybdenum-sulfur nitride, titanium-tungsten-sulfur nitride, or a combination thereof. In some embodiments, the pull-up layer includes titanium oxide, tungsten oxide, zirconium oxide, manganese oxide, molybdenum oxide, or a combination thereof.

The use of these materials in the protective layer and/or the pull-up layer may provide sufficient mechanical durability without the use of the TPF. Thus, manufacturing time and costs may be reduced.

Figure 1:
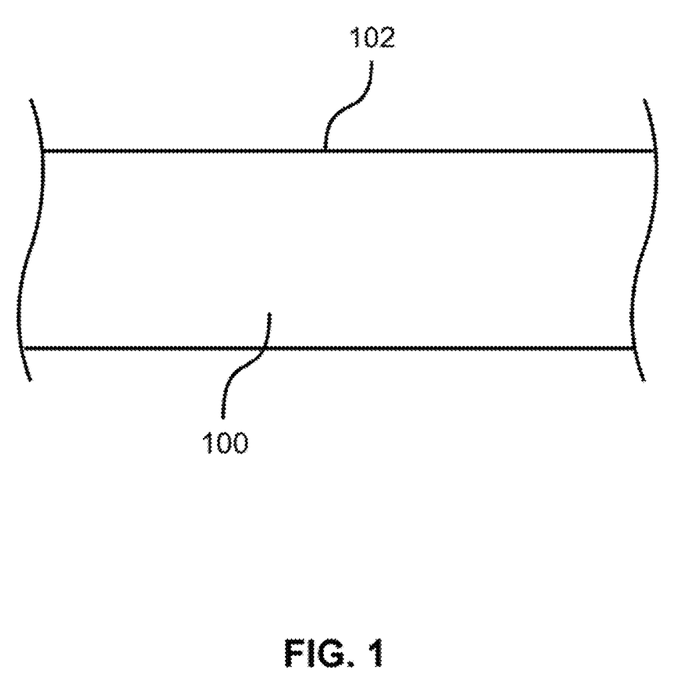
FIG. 1 is a cross-sectional side view of a glass body according to some embodiments.

FIG. 1 illustrates a glass body 100 according to some embodiments. The glass body 100 shown in FIG. 1 is a glass substrate with a surface 102 (e.g., an upper surface) and a thickness (not shown) of, for example, between about 1 millimeter (mm) and about 12 mm. In a testing environment, the substrate may be round with a diameter of, for example, about 200 or about 300 mm. However, in a manufacturing environment, the substrate may be square or rectangular and significantly larger (e.g., about 0.5-about 6 meters (m) across). As such, one skilled in the art may recognize the glass body 100 as one suitable for use in a window (or window assembly), such as in a building or in a vehicle. However, it should be understood that although the glass body 100 shown in FIG. 1 is a substrate, the abrasion resistant coating(s) described below may be utilized on various sizes and shapes of glass bodies, including, but not limited to, those suitable for bottles, containers, lenses, photovoltaic devices, and screens for flat-panel displays, touch panels, and climate control systems.

The various layers described below which are formed above the glass body 100 may be formed sequentially (i.e., from bottom to top) above the surface 102 of the glass body 100 using any suitable methods, such as physical vapor deposition (PVD) and/or reactive sputtering. In some embodiments, the layers are formed above the entire glass body 100. However, in some embodiments, the layers may only be formed above isolated portions of the glass body 100. Although the layers may be described as being formed "above" the previous layer (or the glass body), it should be understood that in some embodiments, each layer is formed directly on (and adjacent to) the previously provided/formed component (e.g., layer). In some embodiments, additional layers may be included between the layers, and other processing steps may also be performed between the formation of various layers.

Figure 2:
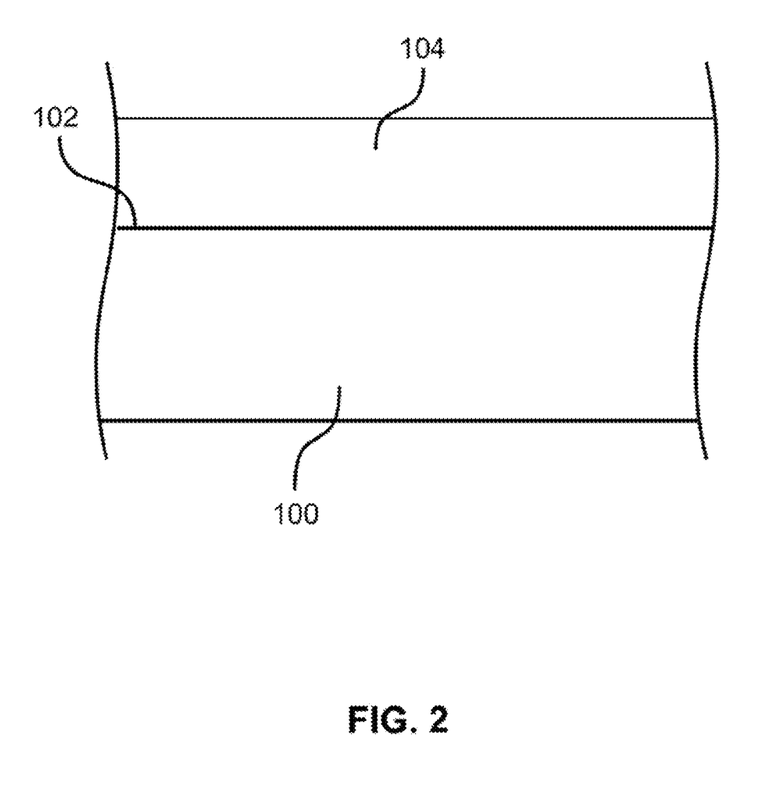
FIG. 2 is a cross-sectional side view of the glass body of FIG. 1 with an abrasion resistant layer formed above.

Although not shown, in some embodiments, the surface 102 of the glass body 100 is first cleaned using, for example, any suitable wet cleaning process, as is commonly understood. Referring now to FIG. 2, an abrasion resistant layer 104 is then formed above the surface 102 of the glass body 100. In some embodiments, the abrasion resistant layer includes (e.g., is made of) an amorphous carbon, such as diamond-like carbon (DLC), as is commonly understood. The abrasion resistant layer 104 may have a thickness of, for example, between about 5 Angstroms (A) and 100 nanometers (nm).

Figure 3:
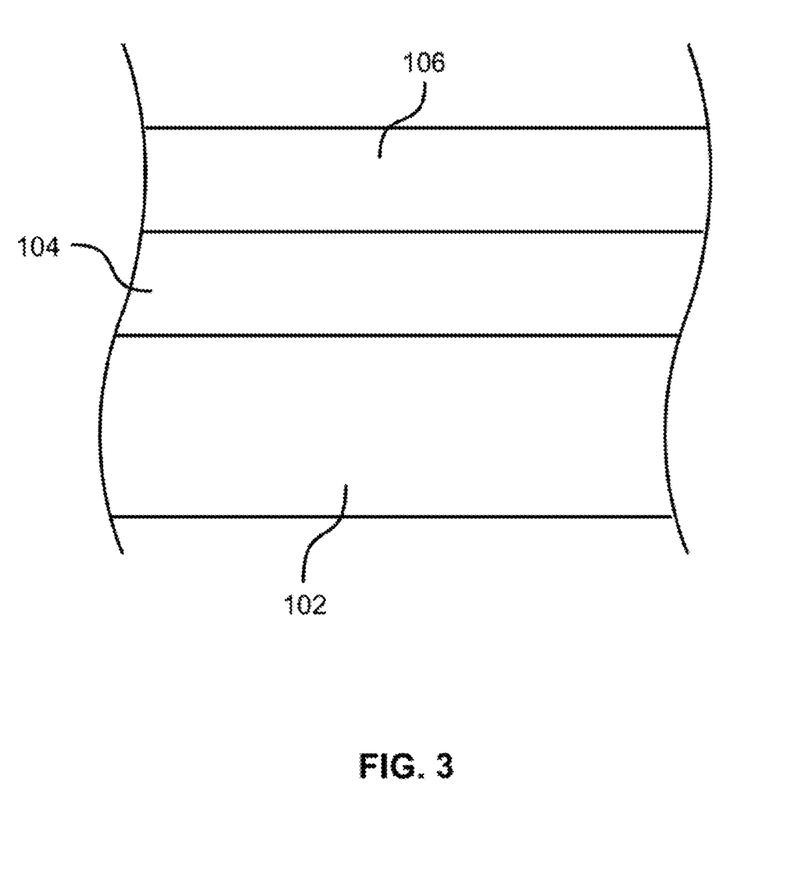
FIG. 3 is a cross-sectional side view of the glass body of FIG. 2 with a pull-up layer formed above the abrasion resistant layer.

As shown in FIG. 3, a "pull-up" layer (or first protective layer) 106 is then formed above the abrasion resistant layer 104. In some embodiments, the pull-up layer 106 includes titanium, tungsten, zirconium, manganese, molybdenum, or a combination thereof. In some embodiments, the pull-up layer 106 is made of an oxide, such as a titanium-based oxide (e.g., titanium oxide). In some embodiments, the pull-up layer 106 is made of tungsten oxide, zirconium oxide, manganese oxide, molybdenum oxide, or a combination thereof. The pull-up layer 106 may have a thickness of between about 5 nm and about 30 nm, such as about 15 nm.

Figure 4:
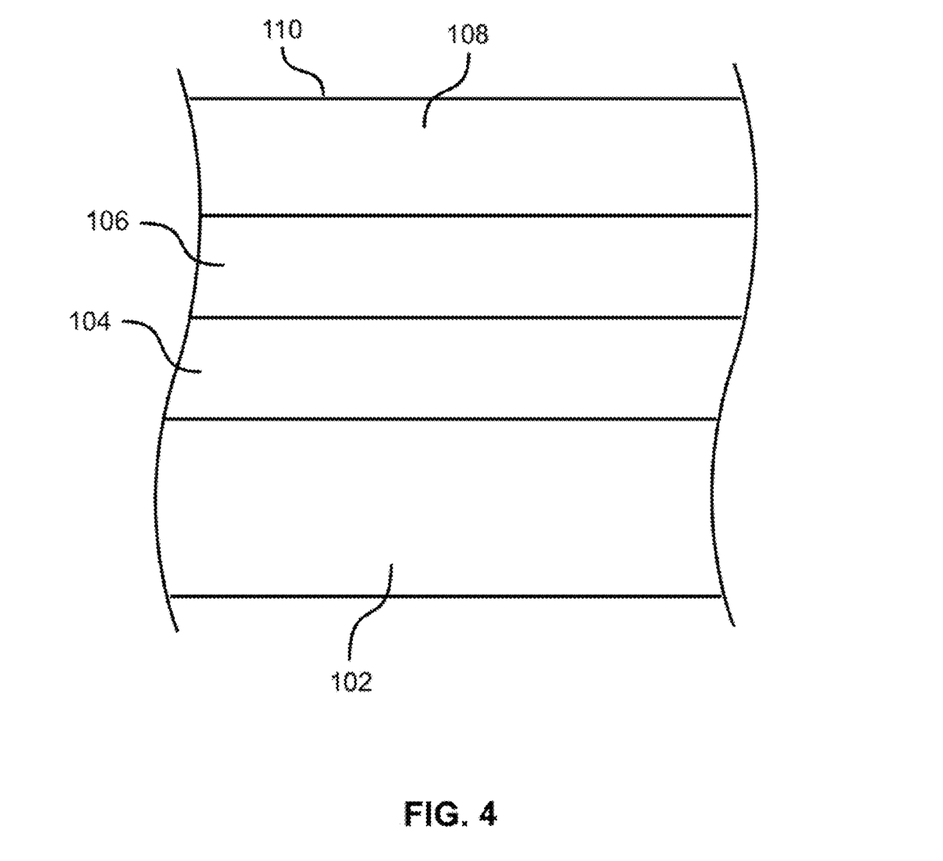
FIG. 4 is a cross-sectional side view of the glass body of FIG. 3 with a protective layer formed above the pull-up layer.

Referring to FIG. 4, a (second) protective layer 108 is formed above the pull-up layer 106. In some embodiments, the protective layer 108 is made of a nitride, such as a titanium-based nitride (e.g., titanium nitride). The protective layer 108 may include titanium alloys, such as titanium-aluminum, titanium-silicon-zirconium, titanium-carbon, titanium-boron, titanium-molybdenum-sulfur, titanium-tungsten-sulfur, and/or combinations thereof. In some embodiments, the titanium alloys are used in nitrides, such as titanium-aluminum nitride, titanium-silicon-zirconium nitride, titanium-carbon nitride, titanium-boron nitride, titanium-molybdenum-sulfur nitride, titanium-tungsten-sulfur nitride, and/or combination thereof. The protective layer 108 may have a thickness of between about 10 nm and about 40 nm, such as about 20 nm.

In some embodiments, the protective layer 108 is the last layer formed above the glass body 100 (i.e., at least with respect to the abrasion resistant coatings described herein) such that a surface 110 (e.g., an upper surface) of the protective layer 108 remains exposed during subsequent processing steps. That is, in contrast to conventional methods for forming abrasion resistant glass coatings, a TPF is not formed/deposited above the protective layer 108 to protect layers 104, 106, and 108 during handling, transportation, and tempering, as the pull-up layer 106 and the protective layer 108, as described herein, are sufficiently durable. As such, the glass body 100, the abrasion resistant layer 104, the pull-up layer 106, and the protective layer 108 may be considered to form a coated article. However, as described below, the pull-up layer 106 and the protective layer 108 are often removed before the coated article is utilized for its intended purpose.

Figure 5:
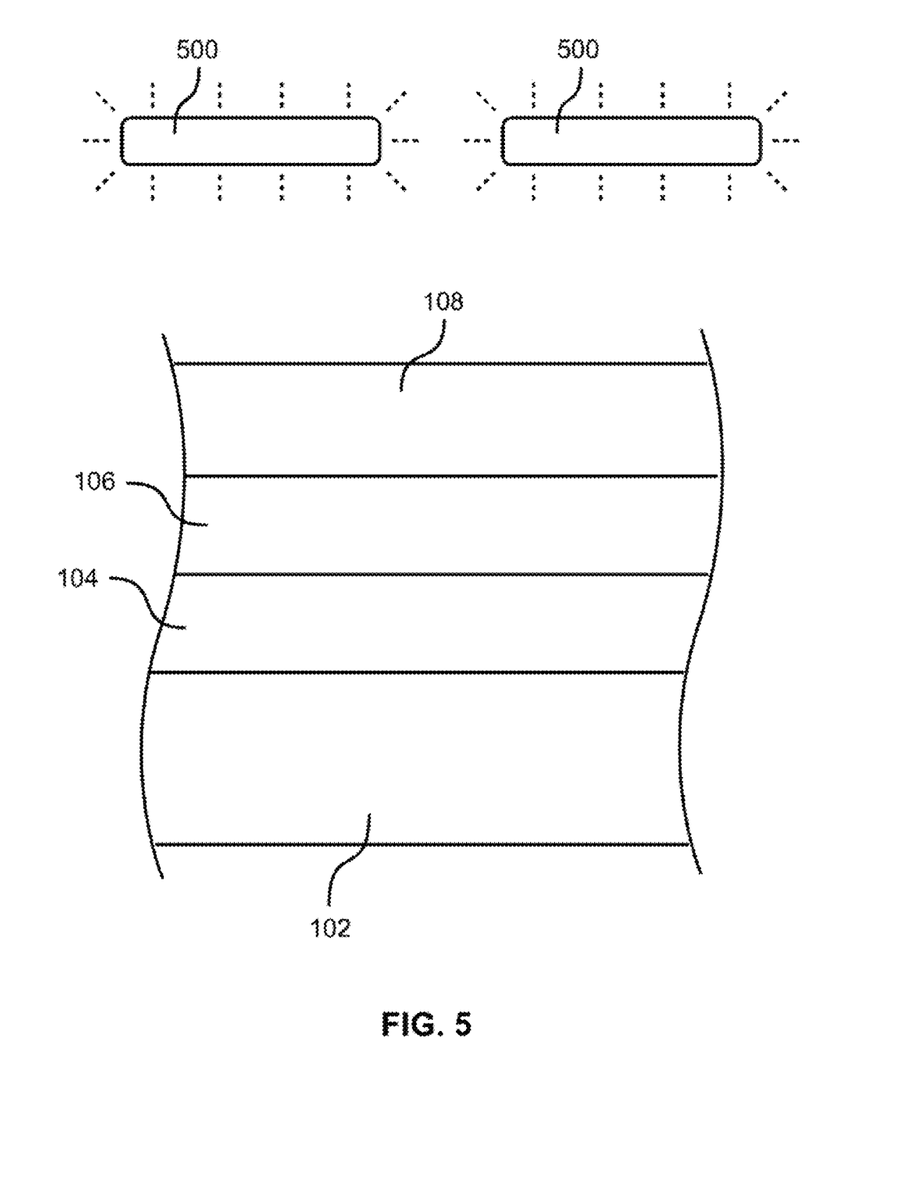
FIG. 5 is a cross-sectional side view of the glass body of FIG. 4 undergoing a tempering process.

Referring now to FIG. 5, in some embodiments, perhaps after handling and/or transportation, the glass body 100 (along with layers 104-108) undergoes a tempering process, as is commonly understood. The tempering process may include heating the glass body 100 in an oven (i.e., utilizing heating elements 500) to a temperature of between about 600° C. and about 700° C. for about 5 minutes to about 30 minutes. It should be noted that the tempering process is performed with the surface 110 of the protective layer 108 exposed.

Figure 6:
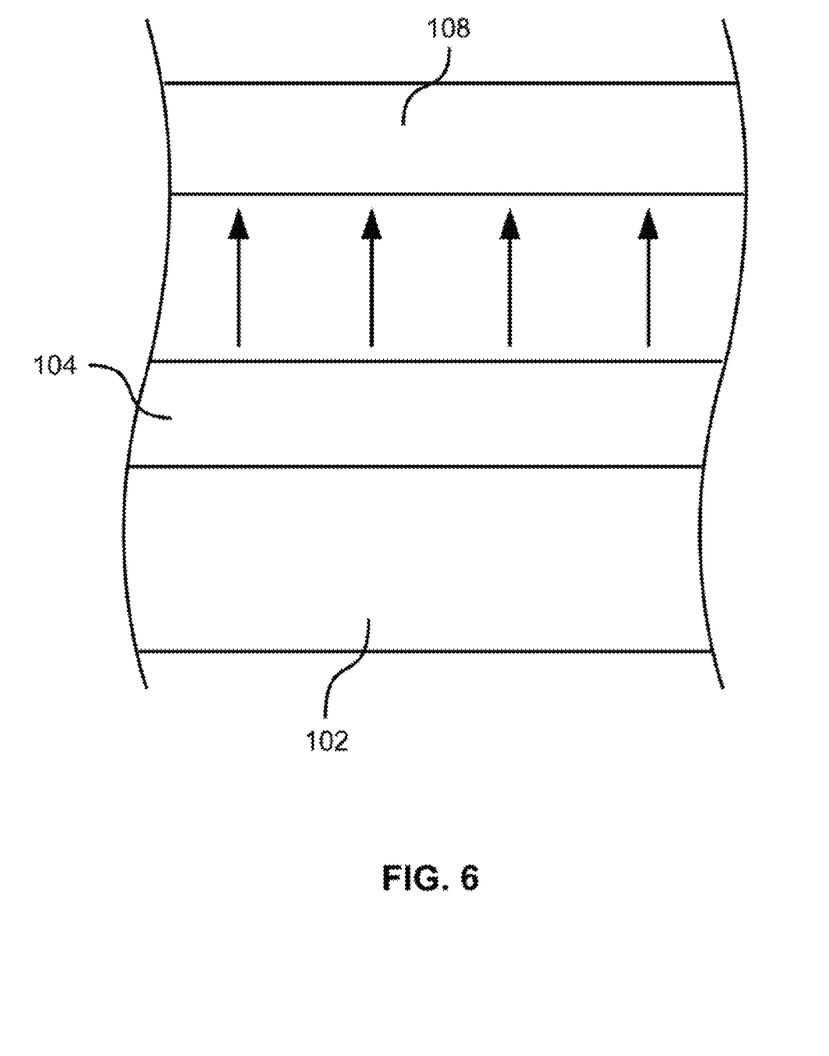
FIG. 6 is a cross-sectional side view of the glass body of FIG. 5 illustrating removal of the pull-up layer and the protective layer.

As shown in FIG. 6 (in combination with FIG. 5), the protective layer 108 (as well as the pull-up layer 106) is then removed from the glass body 100. In some embodiments, the protective layer 108 and the pull-up layer 106 are removed, at least in part, by exposing the glass substrate 100 and layer 104-108 to a liquid (e.g., a solvent) that at least partially dissolves the pull-up layer 106. Depending on the material(s) used in the pull-up layer 106, the liquid may include water, alcohols, acids, etc.

Figure 7:
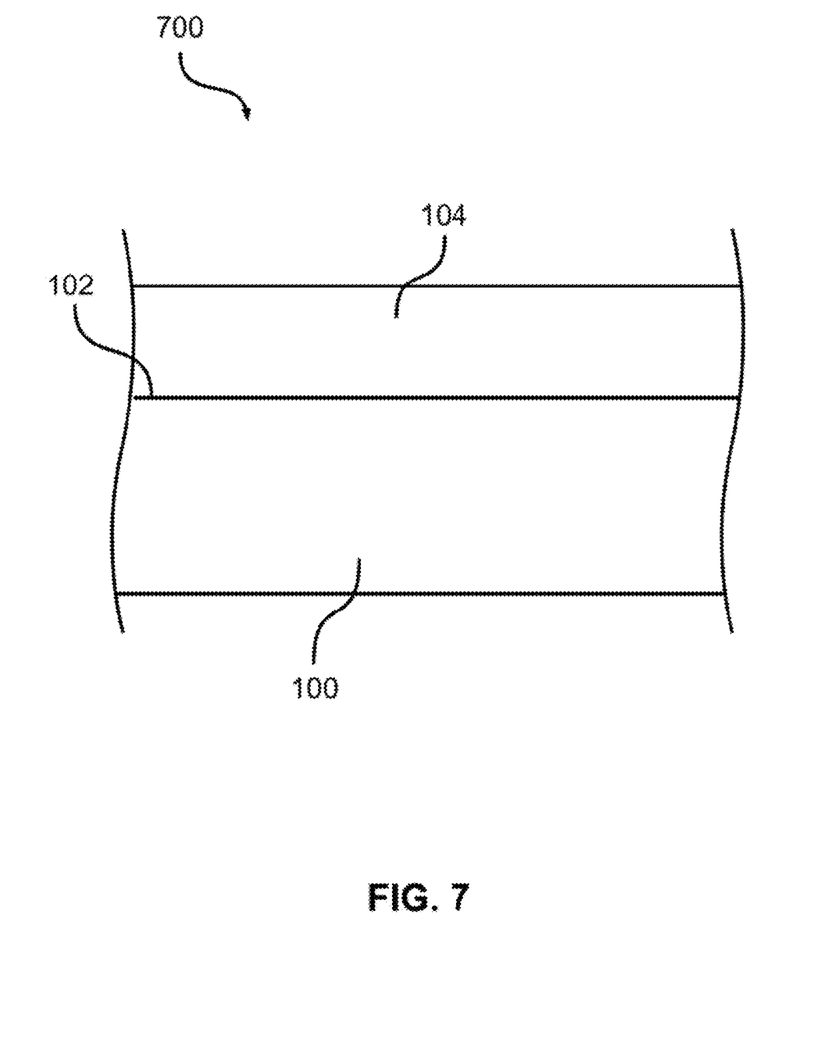
FIG. 7 is a cross-sectional side view of a coated article according to some embodiments.

Referring now to FIG. 7, the removal of the pull-up layer 106 and the protective layer 108 may complete the formation of a coated article 700 (e.g., a tempered glass body with an abrasion resistant layer formed thereon). That is, as referred to above, in at least some embodiments, the pull-up layer 106 and the protective layer 108 are removed before the coated article 700 is utilized for its intended purpose.

FIGS. 8-15 are photographs (with a field of view of 160 micrometers (µm) across) showing the results of tests performed on both conventional protective layers and protective layers described herein (e.g., the pull-up layer 106 and the protective layer 108) formed above a glass substrate.

Figure 8:
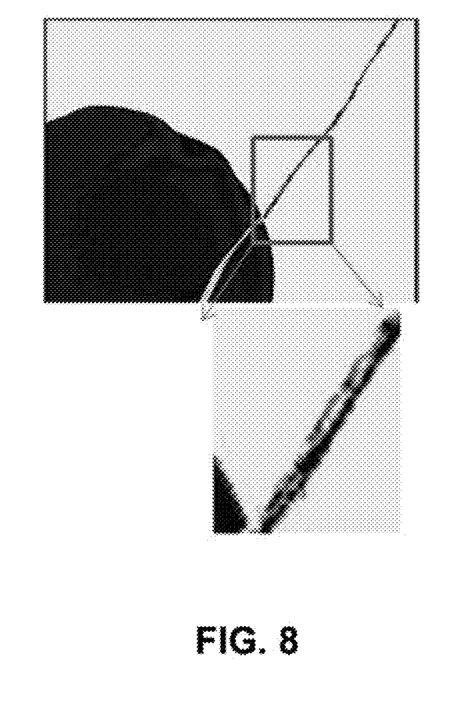
FIGS. 8-15 are photographs showing the results of various scratch-resistance tests of various pull-up and protective layers.

In particular, FIGS. 8-11 show the results of scratch tests performed using a sclerometer, as is commonly understood. The protective layers tested in FIG. 8 included a 20 nm silicon nitride layer formed above a 15 nm zinc oxide layer. As shown in FIG. 8, the silicon nitride layer and the zinc oxide layer were significantly damaged (i.e., scratched) by the sclerometer.

Figure 9:
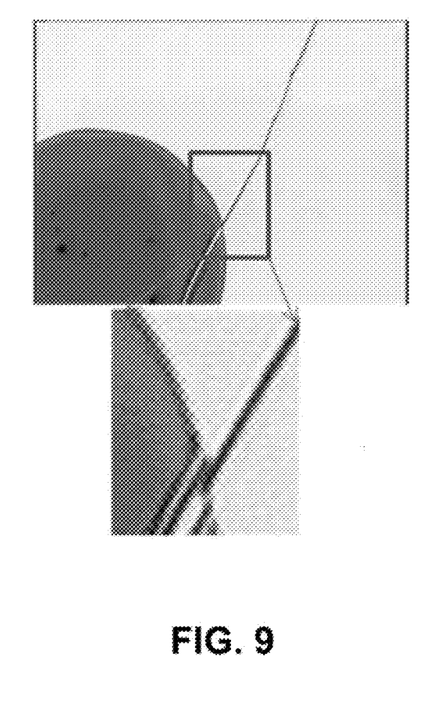

The protective layers tested in FIG. 9 included a 20 nm titanium nitride layer formed above a 15 nm zinc oxide layer. As shown in FIG. 9, the damage to the titanium nitride layer and the zinc oxide layer was not quite as bad as the sample shown in FIG. 8, however, the scratch is still rather significant.

Figure 10:
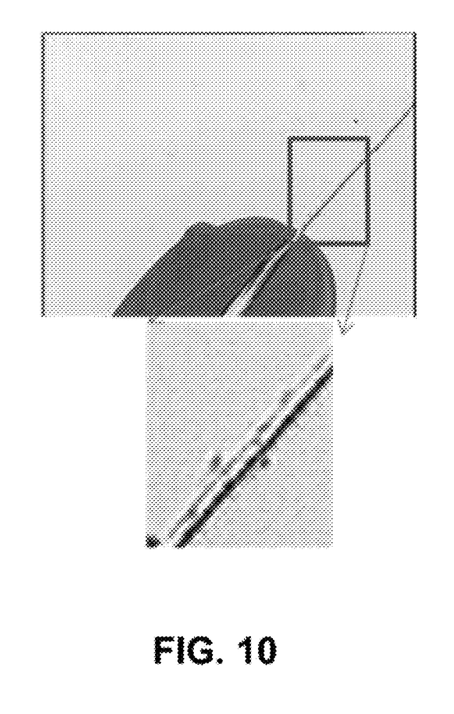

The protective layers tested in FIG. 10 included a 20 nm silicon nitride layer formed above a 15 nm titanium oxide layer. As shown in FIG. 10, the damage to the silicon nitride layer and the titanium oxide layer was about the same as that of the sample shown in FIG. 9.

Figure 11:
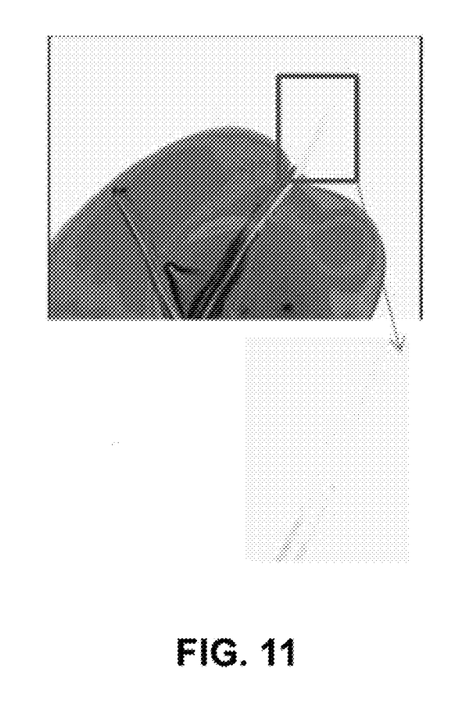

The protective layers tested in FIG. 11 included a 20 nm titanium nitride layer formed above a 15 nm titanium oxide layer. As shown in FIG. 11, the damage to the titanium nitride layer and the titanium oxide layer was significantly less than any of the samples shown in FIG. 8, 9, or 10.

Figure 12:
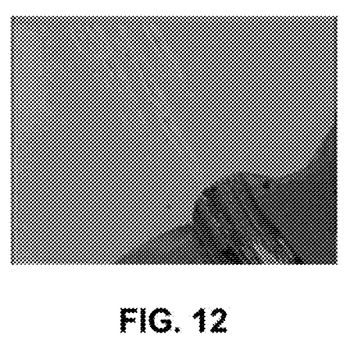

FIGS. 12-15 show the results of scratch tests performed using a universal pencil test, as is commonly understood. The protective layers tested in FIG. 12 included a 20 nm silicon nitride layer formed above a 15 nm zinc oxide layer. As shown in FIG. 12, the silicon nitride layer and the zinc oxide layer were significantly damaged (i.e., scratched) by the pencil test.

Figure 13:
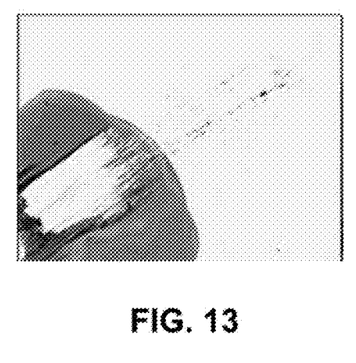

The protective layers tested in FIG. 13 included a 20 nm silicon nitride layer formed above a 15 nm titanium oxide layer. As shown in FIG. 13, the damage to the silicon nitride layer and the titanium oxide layer was not quite as bad as the sample shown in FIG. 12, however, the scratch is still rather significant.

Figure 14:
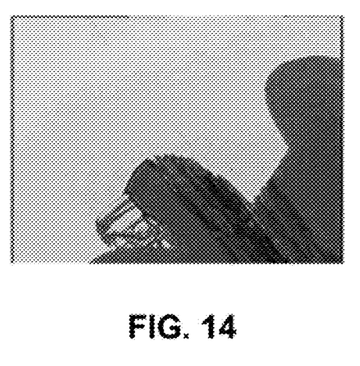

The protective layers tested in FIG. 14 included a 20 nm titanium nitride layer formed above a 15 nm zinc oxide layer. As shown in FIG. 14, the damage to the titanium nitride layer and the zinc oxide layer was significantly less than that of the samples shown in FIGS. 12 and 13. However, some evidence of a scratch is still visible.

Figure 15:
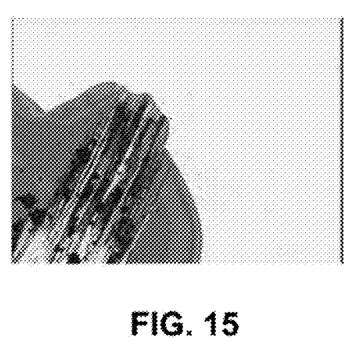

The protective layers tested in FIG. 15 included a 20 nm titanium nitride layer formed above a 15 nm titanium oxide layer. As shown in FIG. 15, the damage to the titanium nitride layer and the titanium oxide layer was significantly less than any of the samples shown in FIG. 12, 13, or 14, as so evidence of a scratch can be seen.

Thus, the photographs shown in FIGS. 8-15 show that the use of a titanium-based nitride layer and a titanium-based oxide general increases the durability (i.e., the scratch resistance) of the protective layers. The results of these tests suggest that the use of a TPF may not be necessary when some of the materials described herein are used in the pull-up layer and the protective layer, as these materials, used in the protective layers and/or the pull-up layer, may provide sufficient protection. Such a result may reduced manufacturing time and costs for abrasion resistant glass coatings, as the TPF does not need to be purchased, installed, and removed for manufacturing.

Figure 16:
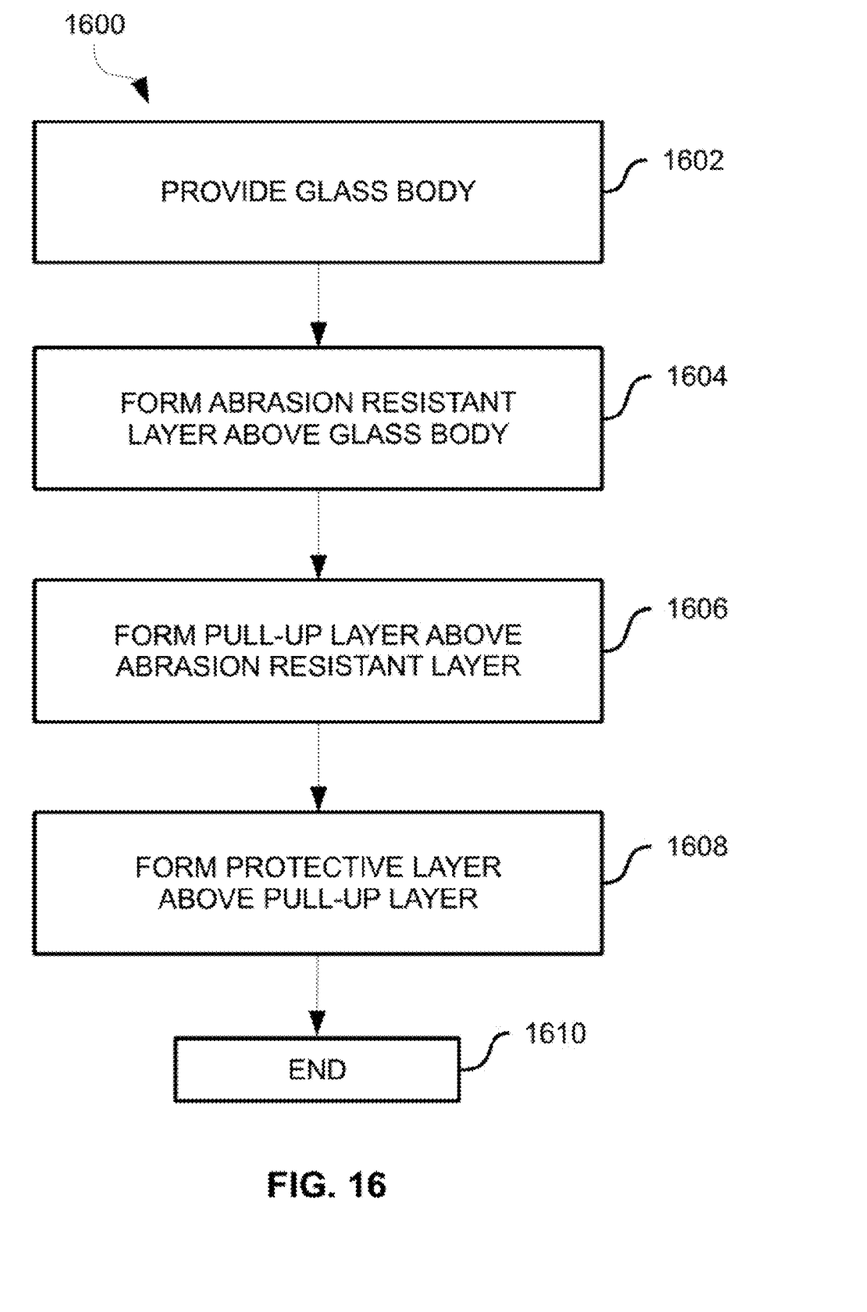
FIG. 16 is a flow chart illustrating a method for forming an abrasion resistant coating according to some embodiments.

FIG. 16 a flow chart illustrating a method 1600 for forming an abrasion resistant coating (and/or a coated article) according to some embodiments. At block 1602, the method 1600 begins with a glass body being provided. In some embodiments, the glass body is a substrate. However, in some embodiments, the glass body is sized and shaped such that it is suitable to be used for bottles, containers, lenses, photovoltaic devices, and screens for flat-panel displays, touch panels, and climate control systems.

At block 1604, an abrasion resistant layer is formed above the glass body. The abrasion resistant layer may be made of amorphous carbon. In some embodiments, the abrasion resistant layer is made of diamond-like carbon (DLC).

At block 1606, a pull-up layer is formed above the abrasion resistant layer. In some embodiments, the pull-up layer is made of an oxide, such as titanium oxide, tungsten oxide, zirconium oxide, manganese oxide, molybdenum oxide, titanium oxide, or a combination thereof.

At block 1608, a protective layer is formed above the pull-up layer. In some embodiments, the protective layer is made of a titanium-based nitride. Examples of titanium-based nitrides includes titanium nitride, titanium-aluminum nitride, titanium-silicon-zirconium nitride, titanium-carbon nitride, titanium-boron nitride, titanium-molybdenum-sulfur nitride, titanium-tungsten-sulfur nitride, and combinations thereof.

Although not shown in FIG. 16, in some embodiments, the method may also include tempering the glass body and removing the pull-up and protective layers, as described above. At block 1610, the method 1600 ends.

Thus, in some embodiments, a method for forming an abrasion resistant glass coating is provided. A glass body is provided. An abrasion resistant layer is formed above the glass body. The abrasion resistant layer includes an amorphous carbon. A pull-up layer is formed above the abrasion resistant layer. A protective layer is formed above the pull-up layer. The protective layer includes a titanium-based nitride.

In some embodiments, a method for forming an abrasion resistant glass coating is provided. A glass body is provided. An abrasion resistant layer is formed above the glass body. The abrasion resistant layer includes diamond-like carbon. A pull-up layer is formed above the abrasion resistant layer. The pull-up layer includes tungsten oxide, zirconium oxide, manganese oxide, molybdenum oxide, titanium oxide, or a combination thereof. A protective layer is formed above the pull-up layer. The protective layer includes a titanium-based nitride.

In some embodiments, a coated article is provided. The coated article includes a glass body. An abrasion resistant layer is formed above the glass body. The abrasion resistant layer includes an amorphous carbon. An oxide layer is formed above the abrasion resistant layer. A titanium-based nitride layer is formed above the oxide layer.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method for forming an abrasion resistant glass coating, the method comprising:
   providing a glass body;
   forming an abrasion resistant layer above the glass body, wherein the abrasion resistant layer comprises an amorphous carbon;
   forming a pull-up layer above the abrasion resistant layer;
   forming a protective layer above the pull-up layer, wherein the protective layer comprises at least one of titanium-carbon nitride, titanium-molybdenum-sulfur nitride, titanium-tungsten-sulfur nitride, or a combination thereof; and
   after the forming of the protective layer, performing a tempering process on the glass body when an upper surface of the protective layer is exposed.

2. The method of claim 1, wherein the pull-up layer comprises at least one of titanium oxide, tungsten oxide, zirconium oxide, manganese oxide, molybdenum oxide, or a combination thereof.

3. The method of claim 2, wherein the pull-up layer is formed directly on the abrasion resistant layer, and the protective layer is formed directly on the pull-up layer.

4. The method of claim 3, wherein the pull-up layer consists of tungsten oxide, zirconium oxide, manganese oxide, molybdenum oxide, or a combination thereof, and the protective layer consists of titanium-carbon nitride, titanium-molybdenum-sulfur nitride, titanium-tungsten-sulfur nitride, or a combination thereof.

5. The method of claim 4, wherein the tempering process comprises heating the glass body to a temperature of between about 600° C. and 700° C.

6. The method of claim 5, further comprising removing the pull-up layer and the protective layer after the performing of the tempering process.

7. The method of claim 6, wherein the removing of the pull-up layer and the protective layer comprises exposing the pull-up layer to a liquid.

8. The method of claim 1, wherein the amorphous carbon comprises diamond-like carbon.

9. The method of claim 1, wherein the protective layer has a thickness of between about 10 nanometers (nm) and about 40 nm.

10. The method of claim 9, wherein the pull-up layer has a thickness of between about 5 nm and about 30 nm.

11. A method for forming an abrasion resistant glass coating, the method comprising:
    providing a glass body;
    forming an abrasion resistant layer above the glass body, wherein the abrasion resistant layer comprises diamond-like carbon;
    forming a pull-up layer above the abrasion resistant layer, wherein the pull-up layer comprises at least one of titanium oxide, tungsten oxide, zirconium oxide, manganese oxide, molybdenum oxide, or a combination thereof;
    forming a protective layer above the pull-up layer, wherein the protective layer comprises at least one of titanium-carbon nitride, titanium-molybdenum-sulfur nitride, titanium-tungsten-sulfur nitride, or a combination thereof; and after the forming of the protective layer, performing a tempering process on the glass body when an upper surface of the protective layer is exposed.

12. The method of claim 11, wherein the pull-up layer consists of tungsten oxide, zirconium oxide, manganese oxide, molybdenum oxide, or a combination thereof, and the protective layer consists of titanium-carbon nitride, titanium-molybdenum-sulfur nitride, titanium-tungsten-sulfur nitride, or a combination thereof.

13. The method of claim 11, wherein the tempering process comprises heating the glass body to a temperature of between about 600° C. and 700° C.

14. The method of claim 13, further comprising removing the pull-up layer and the protective layer after the performing of the tempering process, wherein the removing of the pull-up layer and the protective layer comprises exposing the pull-up layer to a liquid.

15. The method of claim 14, wherein the pull-up layer is formed directly on the abrasion resistant layer, and the protective layer is formed directly on the pull-up layer.

* * * * *